US012346076B2

(12) United States Patent
Schirmer

(10) Patent No.: US 12,346,076 B2
(45) Date of Patent: Jul. 1, 2025

(54) SOLAR POWER MONITORING AND OPTIMIZATION APPARATUS, SYSTEMS AND METHODS

(71) Applicant: COMTECH (AUST) PTY LTD, Loganholme (AU)

(72) Inventor: Ian Schirmer, Loganholme (AU)

(73) Assignee: COMTECH (AUST) PTY LTD, Queensland (AU)

(*) Notice: Subject to any disclaimer, the term of this patent is extended or adjusted under 35 U.S.C. 154(b) by 568 days.

(21) Appl. No.: 17/638,411

(22) PCT Filed: Aug. 27, 2020

(86) PCT No.: PCT/AU2020/050899
§ 371 (c)(1),
(2) Date: Feb. 25, 2022

(87) PCT Pub. No.: WO2021/035303
PCT Pub. Date: Mar. 4, 2021

(65) Prior Publication Data
US 2022/0299959 A1    Sep. 22, 2022

(30) Foreign Application Priority Data
Aug. 29, 2019    (AU) .................. 2019903171

(51) Int. Cl.
*G05B 19/042*    (2006.01)
*H02J 3/38*    (2006.01)
(Continued)

(52) U.S. Cl.
CPC ............ *G05B 19/042* (2013.01); *H02J 3/381* (2013.01); *H02J 3/46* (2013.01); *H02J 13/00002* (2020.01);
(Continued)

(58) Field of Classification Search
CPC ............ G05B 19/042; G05B 2219/2639; H02J 3/381; H02J 3/46; H02J 13/00002;
(Continued)

(56) References Cited

U.S. PATENT DOCUMENTS 4,445,049 A * 4/1984 Steigerwald ........ H02M 7/5152
363/139
4,494,180 A * 1/1985 Streater ................... H02M 7/48
363/101
(Continued)

FOREIGN PATENT DOCUMENTS

CN    203883764 U    10/2014
CN    108306618 A    7/2018

OTHER PUBLICATIONS

International Preliminary Report on Patentability for corresponding application PCT/AU2020/050899 filed Aug. 27, 2020; Report Mar. 1, 2022.
(Continued)

*Primary Examiner* — Christopher P McAndrew
(74) *Attorney, Agent, or Firm* — CANTOR COLBURN LLP

(57) ABSTRACT

An apparatus to monitor and optimise power output by one or more solar panels to which the apparatus is coupled comprises a processor configured to generate a periodic wave and apply the periodic wave to an output of the one or more solar panels. Analogue-to-digital voltage and current converters receive voltage and current signals respectively from the one or more solar panels and provide digital voltage and current signals to the processor. The processor is configured to: calculate a voltage amplitude and a direct current offset of the periodic wave applied to the output of the one or more solar panels; calculate a differential of a power and a voltage of the one or more solar panels based on the voltage amplitude and the direct current offset; and modify (Continued)

the voltage of the one or more solar panels such that the differential of the power and the voltage of the one or more solar panels is zero, or substantially zero.

34 Claims, 13 Drawing Sheets

(51) Int. Cl.
  *H02J 3/46* (2006.01)
  *H02J 13/00* (2006.01)
  *H02S 50/00* (2014.01)
(52) U.S. Cl.
  CPC ........ *H02J 13/00009* (2020.01); *H02S 50/00* (2013.01); *G05B 2219/2639* (2013.01); *H02J 2300/26* (2020.01)
(58) Field of Classification Search
  CPC ............. H02J 13/00009; H02J 2300/26; H02J 2300/20; H02S 50/00; H02S 50/10; H02S 10/00; Y02B 90/20; Y02E 60/00; Y04S 40/121; G05F 1/67; H03M 1/001; H03M 5/08; H02M 1/0083; H03K 7/08
  See application file for complete search history.

(56) References Cited

U.S. PATENT DOCUMENTS

| | | | | |
|---|---|---|---|---|
| 4,649,334 A * | 3/1987 | Nakajima | ................. | G05F 1/67 |
| | | | | 323/299 |
| 7,193,872 B2 * | 3/2007 | Siri | .................. | H02M 7/53803 |
| | | | | 363/95 |
| 7,324,361 B2 * | 1/2008 | Siri | .................. | H02M 7/53803 |
| | | | | 363/95 |
| 7,796,412 B2 * | 9/2010 | Fornage | ................ | H02M 3/285 |
| | | | | 323/906 |
| 9,257,896 B1 * | 2/2016 | Shih | .......................... | G05F 1/67 |
| 9,467,066 B1 * | 10/2016 | Yu | ............................ | H02J 3/381 |
| 9,960,602 B2 * | 5/2018 | Siri | ...................... | H02J 3/381 |
| 11,018,623 B2 * | 5/2021 | Loewenstern | ........... | H02H 9/02 |
| 11,569,659 B2 * | 1/2023 | Adest | ...................... | H02M 7/42 |
| 2004/0125618 A1 * | 7/2004 | De Rooij | ............ | H02M 7/4807 |
| | | | | 363/17 |
| 2011/0109346 A1 | 5/2011 | Moussaoui | | |
| 2011/0221387 A1 * | 9/2011 | Steigerwald | ............ | B60L 53/38 |
| | | | | 320/108 |
| 2012/0026758 A1 * | 2/2012 | Lee | ................... | H02M 3/33576 |
| | | | | 363/21.13 |
| 2012/0310438 A1 | 12/2012 | Kaiser | | |
| 2013/0107601 A1 * | 5/2013 | Wagoner | ............... | H01L 23/427 |
| | | | | 363/141 |
| 2014/0054969 A1 | 2/2014 | Beijer | | |
| 2014/0265638 A1 | 9/2014 | Orr | | |
| 2014/0371931 A1 * | 12/2014 | Lin | ..................... | H01L 31/0488 |
| | | | | 700/287 |
| 2015/0180408 A1 | 6/2015 | Piklak | | |
| 2017/0179876 A1 | 6/2017 | Freeman | | |
| 2017/0279376 A1 * | 9/2017 | Siri | ..................... | H02M 7/5395 |
| 2018/0316254 A1 | 11/2018 | Kuo | | |

OTHER PUBLICATIONS

International Search Report for corresponding application PCT/AU2020/050899 filed Aug. 27, 2020; Mail date Nov. 6, 2020.
Written Opinion for corresponding application PCT/AU2020/050899 filed Aug. 27, 2020; Mail date Nov. 6, 2020.

* cited by examiner

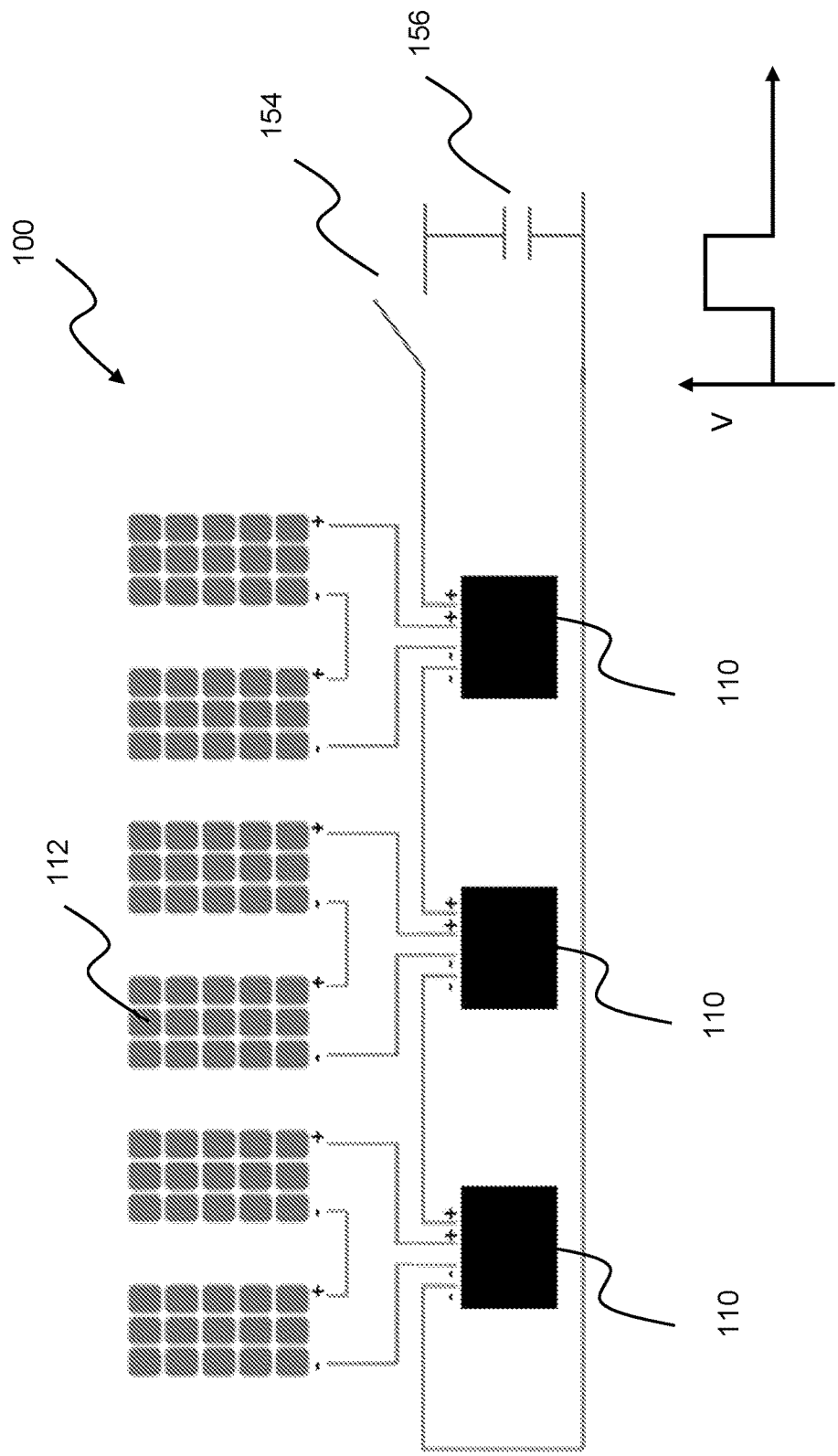
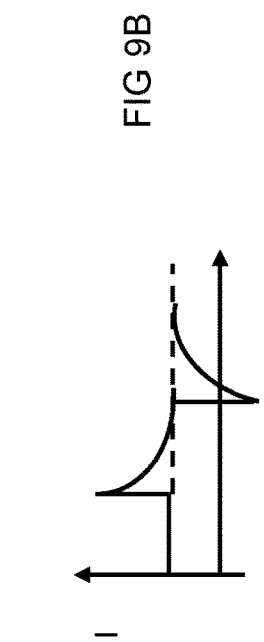
FIG 8
FIG 9A
FIG 9B

SOLAR POWER MONITORING AND OPTIMIZATION APPARATUS, SYSTEMS AND METHODS

FIELD OF THE INVENTION

The present invention relates to a solar power monitoring and optimisation apparatus, systems and associated methods. In particular, the present invention relates to an apparatus for monitoring and optimizing the power output of one or more solar panels, communication and monitoring systems comprising one or more such apparatus, and associated methods. Particular embodiments of the present invention relate to safety apparatus, systems and methods relating to solar panels.

BACKGROUND TO THE INVENTION

Solar panels and solar arrays are widely used to generate electricity in industrial, commercial and residential settings. It is desirable to optimise the power output of the solar panels to maximise the electricity generated. It is also desirable to maximise the efficiency of the solar panels and reduce losses due to, for example, heat.

Problems typically encountered with known power switching apparatus used with solar panels for the generation of electricity include slow switching speeds, unwanted harmonic interference and noise, heat production, which necessitates the use of bulky heat sinks, and the reduced lifespan of such products in harsh environmental conditions. Another problem with known power switching apparatus in solar arrays is that in the event of a fire, many solar arrays are not considered safe for use with water from a firefighter's hose.

OBJECT OF THE INVENTION

A preferred object of the present invention is to provide a solar power monitoring apparatus and/or system and/or method that addresses or at least ameliorates one or more of the aforementioned problems and/or provides a useful commercial alternative.

SUMMARY OF THE INVENTION

Embodiments of the present invention concern an apparatus for monitoring and optimizing the power output of one or more solar panels to which the apparatus is connected. Embodiments of the present invention also concern such an apparatus comprising a safety switch or safety feature. Further embodiments of the present invention are directed to communication and monitoring systems comprising one or more such apparatus. Yet further embodiments of the present invention are directed to methods of monitoring and optimizing the power output of one or more solar panels.

According to one aspect, but not necessarily the broadest aspect, the present invention is directed to an apparatus for coupling to one or more solar panels to monitor and optimise power output by the one or more solar panels, the apparatus comprising:
  a processor configured to generate a periodic wave and apply the periodic wave to an output of the one or more solar panels;
  an analogue-to-digital voltage converter for receiving a voltage signal from the one or more solar panels; and
  an analogue-to-digital current converter for receiving a current signal from the one or more solar panels;

wherein the processor is configured to:
  receive a digital voltage signal from the voltage converter and receive a digital current signal from the current converter;
  calculate a voltage amplitude of the periodic wave applied to the output of the one or more solar panels and a direct current offset of the periodic wave;
  calculate a differential of a power and a voltage of the one or more solar panels based on the output from the low pass filters; and
  modify the voltage of the one or more solar panels such that the differential of the power and the voltage of the one or more solar panels is zero, or substantially zero, and thus maximised.

Suitably, the periodic wave is any repeating wave of arbitrary shape and constant frequency. Preferably, the periodic wave is a sinusoidal wave. Alternatively, the periodic wave is a square wave, sawtooth wave or periodic wave of another shape.

Suitably, the periodic wave is a repetitive voltage wave, or a repetitive current wave applied to the output of the one or more solar panels.

Suitably, the periodic wave is of constant frequency between measurement cycles. Alternatively, a frequency of the periodic wave differs between measurement cycles.

In some embodiments, the processor is configured to apply a low pass filter to the digital voltage signal and apply a low pass filter to the digital current signal to calculate the voltage amplitude and the direct current offset of the periodic wave.

In other embodiments, the processor is configured to apply a low pass filter and a bandpass filter to each of the digital voltage signal and the digital current signal to calculate the voltage amplitude and the direct current offset of the periodic wave.

In other embodiments, the processor is configured to apply a Fourier transform to the digital voltage signal and apply a Fourier transform to the digital current signal to calculate the voltage amplitude and the direct current offset of the periodic wave.

Preferably, the apparatus comprises a bi-directional or unidirectional power converter to receive a control signal from the processor to modify the voltage of the one or more solar panels such that the differential of the power and the voltage of the one or more solar panels is zero, or substantially zero and thus maximised.

Preferably, the control signal is based on the output of a maximum power point controller module and the output of a periodic wave voltage or current controller module, such as a solar panel sin wave voltage or current controller module or a square wave voltage or current controller module of the apparatus.

Preferably, the periodic wave is applied by moving energy between an output energy storage device in communication with the bi-directional or unidirectional power converter and an input energy storage device in communication with the bi-directional or unidirectional power converter and the one or more solar panels.

Preferably, the output energy storage device and/or the input energy storage device are in the form of capacitors.

Preferably, the apparatus comprises a printed circuit board (PCB) having a first control side comprising the processor and a second, opposite power side comprising a plurality of power switching components preferably arranged substantially in a U shape or a C shape around a power inductor to maximise power switching speeds, and/or minimise harmonic noise and/or avoid the need for a heat sink.

Preferably, the apparatus comprises a fully plastic enclosure.

Suitably, the apparatus detects a state of a solar circuit breaker or isolator switch coupled to a circuit comprising the apparatus and the one or more solar panels by the apparatus applying a voltage pulse on the circuit looking for a current.

Suitably, the circuit comprises a capacitor on the load side of the solar circuit breaker or isolator switch and the apparatus detects the capacitor when the solar circuit breaker or isolator switch is closed.

According to another aspect, but not necessarily the broadest aspect, the present invention is directed to a method of monitoring and optimising power output by one or more solar panels by coupling an apparatus to one or more solar panels, the method comprising:

generating, in a processor, a periodic wave and applying the periodic wave to an output of the one or more solar panels;

receiving, in an analogue-to-digital voltage converter of the apparatus, a voltage signal from the one or more solar panels;

receiving, in an analogue-to-digital current converter of the apparatus, a current signal from the one or more solar panels;

receiving, in the processor coupled to the voltage converter a digital voltage signal;

receiving, in the processor coupled to the current converter, a digital current signal;

the processor:

calculating a voltage amplitude of the periodic wave applied to the output of the one or more solar panels and a direct current offset of the periodic wave;

calculating a differential of a power and a voltage of the one or more solar panels based on the output from the low pass filters; and modifying the voltage of the one or more solar panels such that the differential of the power and the voltage of the one or more solar panels is zero, or substantially zero and thus maximised.

Calculating the voltage amplitude and the direct current offset of the periodic wave may comprise one of the following:

the processor applying a low pass filter to the digital voltage signal and applying a low pass filter to the digital current signal; or the processor applying a low pass filter and a bandpass filter to each of the digital voltage signal and the digital current signal; or the processor applying a Fourier transform to the digital voltage signal and applying a Fourier transform to the digital current signal.

The method may comprise applying the periodic wave to the output of the one or more solar panels by moving energy between an output energy storage device in communication with the bi-directional or unidirectional power converter and an input energy storage device in communication with the bi-directional or unidirectional power converter and the one or more solar panels.

Preferably, the method comprises a bi-directional power converter receiving a control signal from the processor to modify the voltage of the one or more solar panels such that the differential of the power and the voltage of the one or more solar panels is zero, or substantially zero.

The method may comprise the apparatus detecting a state of a solar circuit breaker or isolator switch coupled to a circuit comprising the apparatus and the one or more solar panels by the apparatus applying a voltage pulse on the circuit looking for a current.

Suitably, the circuit comprises a capacitor on the load side of the solar circuit breaker or isolator switch and the method may comprise the apparatus detecting the capacitor when the solar circuit breaker or isolator switch is closed.

According to a further aspect, but not necessarily the broadest aspect, the present invention is directed to a solar communication and monitoring system comprising one or more of the aforementioned power monitoring and optimisation apparatus coupled to one or more solar panels, wherein the one or more power monitoring and optimisation apparatus are configured to modify the voltage of the one or more solar panels such that the differential of the power and the voltage of the one or more solar panels is zero, or substantially zero, thus maximising the power output of the one or more solar panels.

Suitably, each power monitoring and optimisation apparatus is coupled to one solar panel. Alternatively, each power monitoring and optimisation apparatus is coupled to a plurality of solar panels.

Preferably, the solar panels are connected in series and the power monitoring and optimisation apparatus are connected in series.

Preferably, the power monitoring and optimising apparatus are coupled to a communications and safety indicator apparatus.

Preferably, the power monitoring and optimising apparatus and the communications and safety indicator apparatus are coupled to an inverter and/or battery via isolator switches.

Suitably, the apparatus detects a state of a solar circuit breaker or isolator switch coupled to the circuit by the apparatus applying a voltage pulse on the circuit looking for a current.

Suitably, the circuit comprises a capacitor on the load side of the solar circuit breaker or isolator switch and the apparatus detects the capacitor when the solar circuit breaker or isolator switch is closed.

According to a yet further aspect, but not necessarily the broadest aspect, the present invention is directed to a solar power monitoring and optimisation kit comprising one or more of the aforementioned power monitoring and optimisation apparatus for coupling to one or more solar panels and a communications and safety indicator apparatus for coupling to the one or more power monitoring and optimisation apparatus, to an inverter and/or battery and to the mains.

According to another aspect, but not necessarily the broadest aspect, the present invention is directed to an apparatus to detect a state of a solar circuit breaker or isolator switch coupled to a circuit comprising one or more solar panels, wherein the apparatus applies a voltage pulse on the circuit looking for a current.

Suitably, the circuit comprises a capacitor on the load side of the solar circuit breaker or isolator switch and the apparatus detects the capacitor when the solar circuit breaker or isolator switch is closed.

According to another aspect, but not necessarily the broadest aspect, the present invention is directed to a method of detecting a state of a solar circuit breaker or isolator switch coupled to a circuit comprising one or more solar panels and a communications and safety indicator apparatus, the method comprising the apparatus applying a voltage pulse on the circuit looking for a current.

Suitably, the circuit comprises a capacitor on the load side of the solar circuit breaker or isolator switch and the method comprises the apparatus detecting the capacitor when the solar circuit breaker or isolator switch is closed.

Further features and/or aspects of the present invention will become apparent from the following detailed description.

BRIEF DESCRIPTION OF THE DRAWINGS

Embodiments of the present invention will now be described by way of example only with reference to the accompanying drawings in which like reference numerals refer to like features. In the drawings:

FIG. 8 shows the power monitoring and optimising apparatus operating as a safety switch in the power monitoring and optimising system;

FIGS. 9A and 9B show graphs representing an applied voltage pulse and measured current for the safety aspect of the power monitoring and optimising apparatus shown in FIG. 8;

Figure 1:
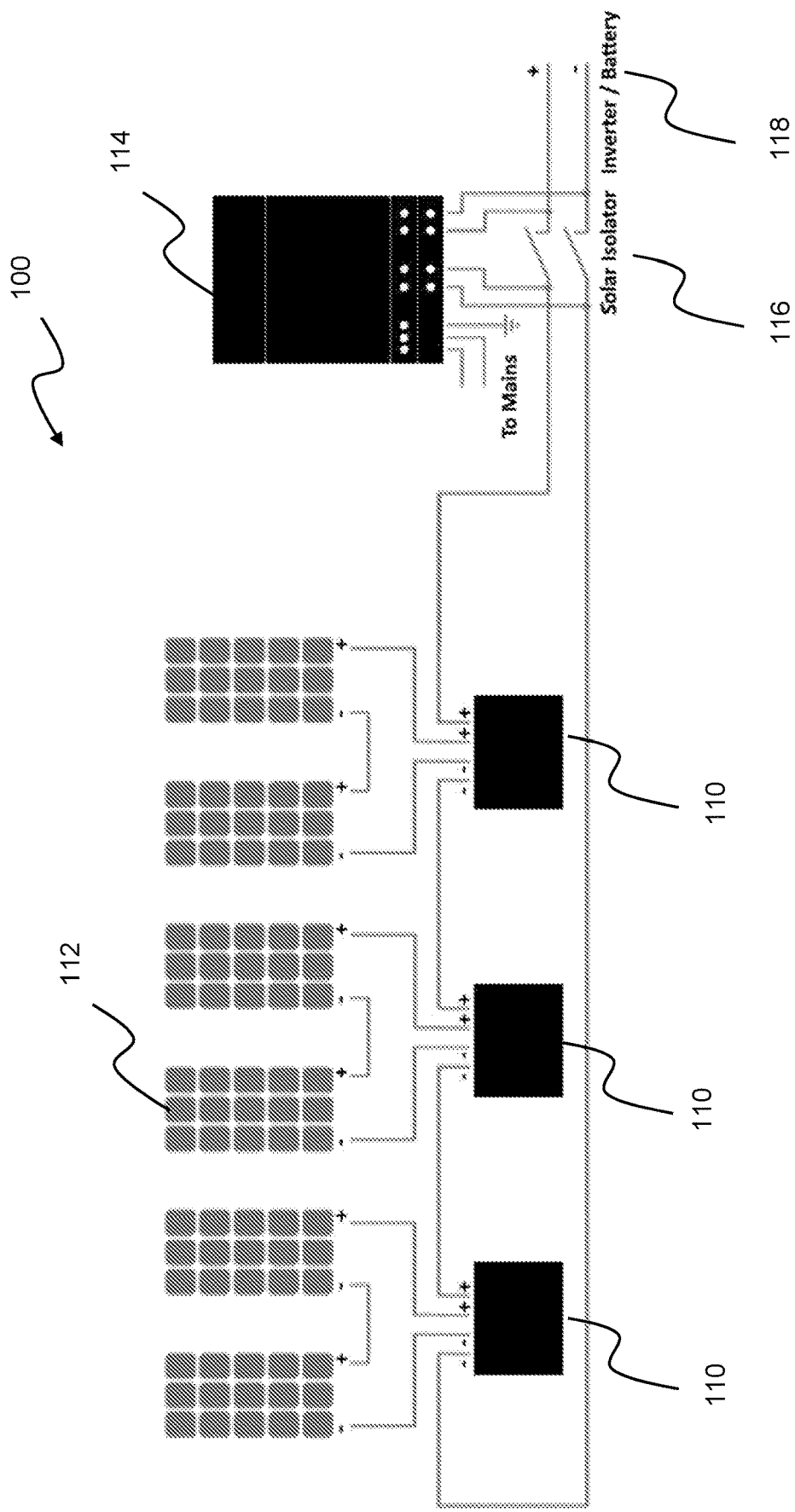
FIG. 1 is a schematic diagram showing a plurality of power monitoring and optimising apparatus comprising a safety switch according to an embodiment of the present invention for monitoring and optimising power output from solar panels showing the apparatus coupled to the solar panels in a first system configuration.

Skilled addressees will appreciate that elements in the drawings are illustrated for simplicity and clarity and have not necessarily been drawn to scale. For example, the relative dimensions of some of the elements in the drawings may be distorted and/or some elements may be omitted to help improve understanding of embodiments of the present invention.

DETAILED DESCRIPTION

Embodiments of the present invention are directed to an apparatus for monitoring and optimizing the power output of one or more solar panels to which the apparatus is connected. Embodiments of the present invention also concern such an apparatus comprising a safety switch. Further embodiments of the present invention are directed to solar panel communication and monitoring systems and kits comprising one or more such apparatus. Yet further embodiments of the present invention are directed to methods of optimizing the power output of one or more solar panels and monitoring methods.

Embodiments of the present invention allow solar panels to be electrically connected in series and have the benefits of the solar panels being connected in series, while mathematically being connected in parallel and provide all of the benefits of parallel connection. The communications system of the present invention uses a radio frequency current, rather than a voltage, thus allowing the communications signals to travel through the system, which is electrically serially connected.

Figure 2:
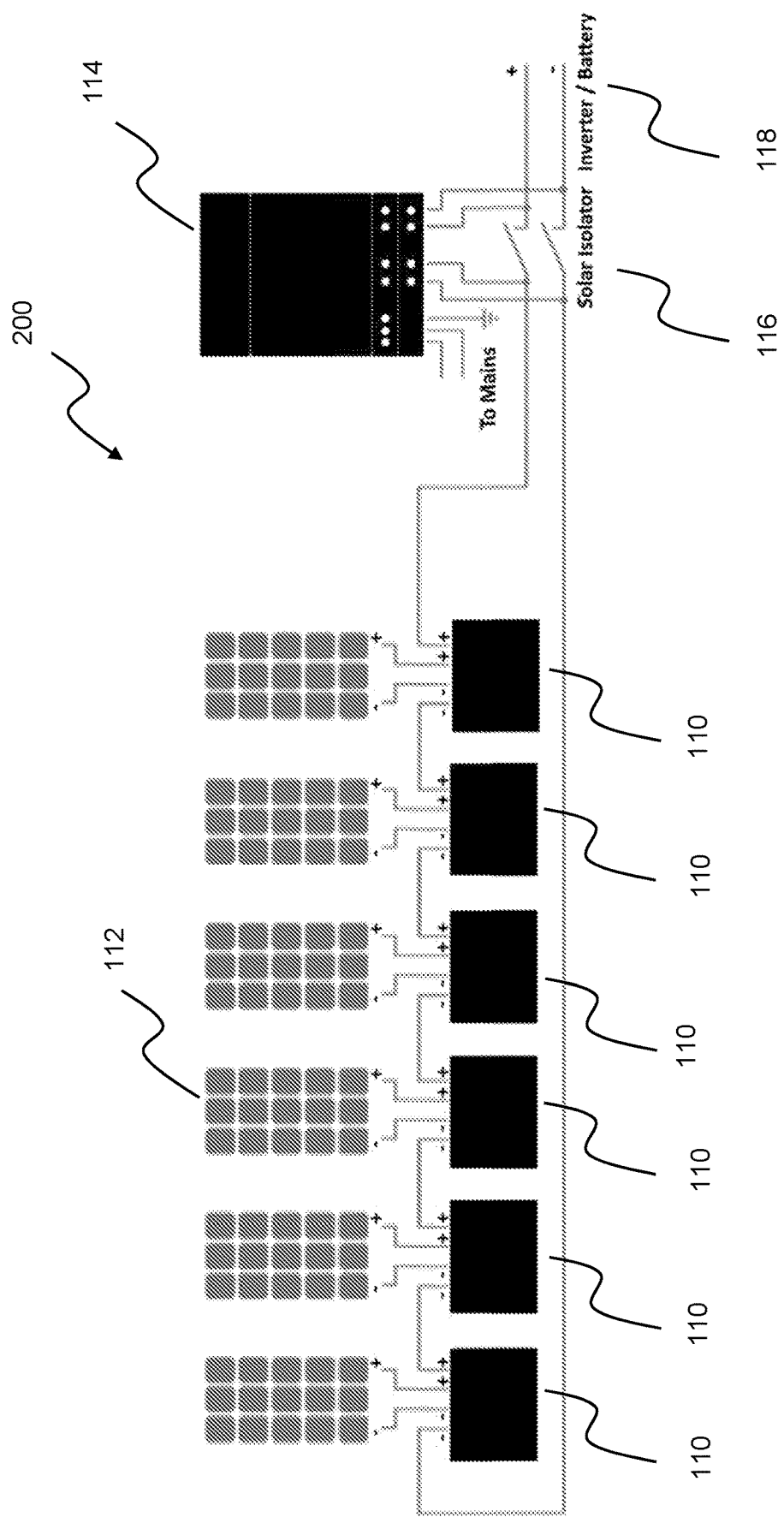
FIG. 2 is a schematic diagram showing a plurality of the apparatus shown in FIG. 1 coupled to the solar panels in a second system configuration.

Reference is made to FIGS. 1 and 2, showing solar panel communication and monitoring systems 100, 200 according to embodiments of the present invention. FIG. 1 shows a system 100 comprising a plurality of power monitoring and optimising apparatus 110, each comprising a safety switch, according to an embodiment of the present invention coupled to a plurality solar panels 112 in a first system configuration. System 100 comprises each power monitoring and optimising apparatus 110 coupled to two solar panels 112. The solar panels are coupled in series. The power monitoring and optimising apparatus 110 are coupled to a communications and safety indicator apparatus 114. The power monitoring and optimising apparatus 110 and the communications and safety indicator apparatus 114 are coupled to an inverter and/or battery 118 via isolator switches 116. The communications and safety indicator apparatus 114 is coupled to the mains electricity supply.

The solar panel communication and monitoring system 200 is similar to the system 100 shown in FIG. 1, but with the power monitoring and optimising apparatus 110 and the solar panels 112 coupled in a second system configuration. System 200 comprises each power monitoring and optimising apparatus 110 coupled to a single solar panel 112. The remainder of the configuration of system 100 is the same as the configuration of system 100. The configuration of the system 200 maximises efficiency. It will be appreciated that the system 200 comprises twice the number of power monitoring and optimising apparatus 110.

It will be appreciated that solar panel communication and monitoring systems according to the present invention can comprise other numbers and configurations of power monitoring and optimising apparatus 110 and solar panels 112 compared to the numbers thereof shown in FIGS. 1 and 2. For example, a single power monitoring and optimising apparatus 110 can be coupled to three or more solar panels 112, or two or more power monitoring and optimising apparatus 110 can be coupled to four or more solar panels 112 etc.

Figure 3A:
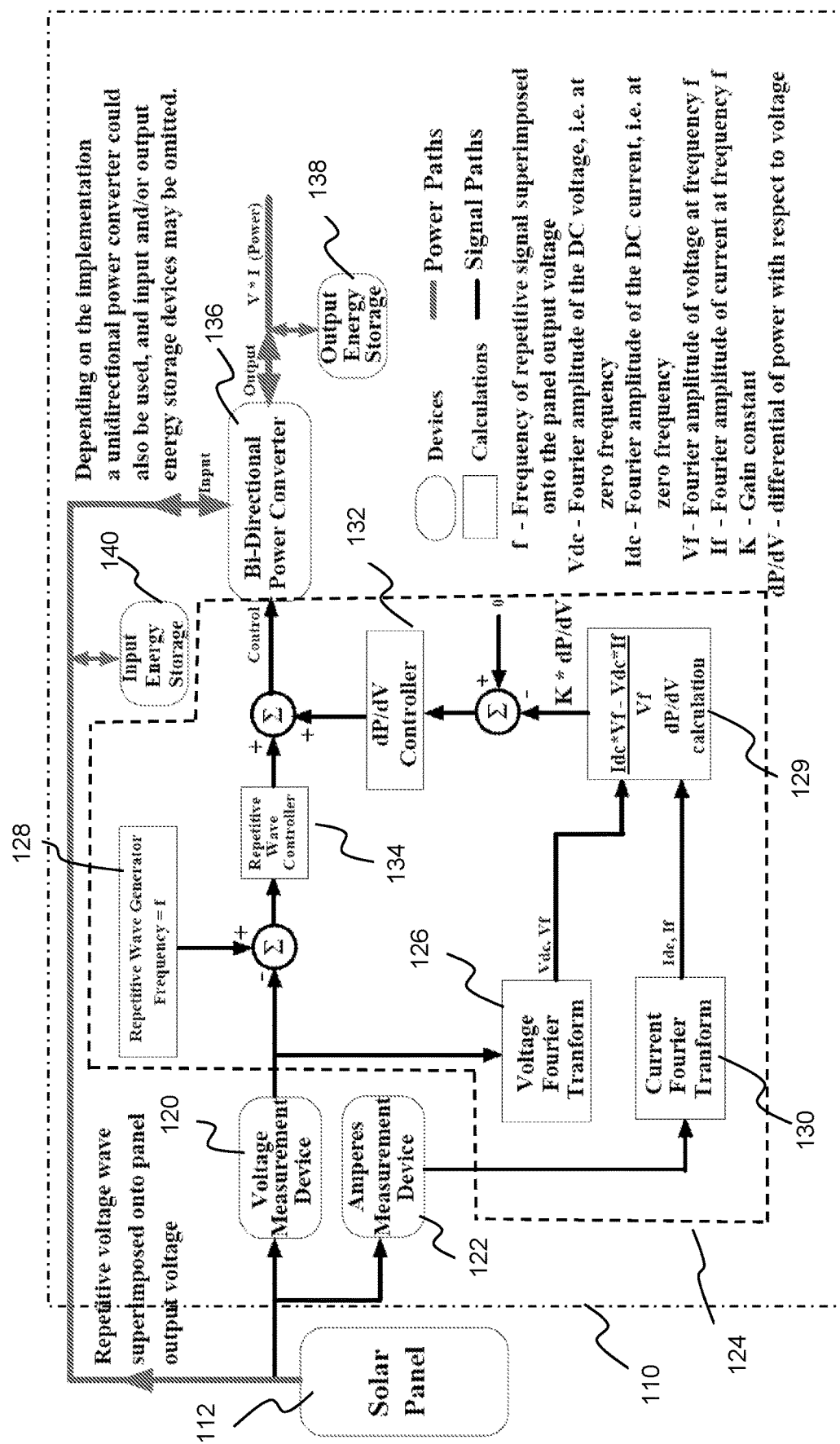
FIG. 3A is a schematic diagram showing power and signal paths within the apparatus shown in FIG. 1 and between a solar panel according to an embodiment of the present invention.

FIG. 3A shows power and signal paths within the power monitoring and optimising apparatus 110 and between a solar panel 112 according to an embodiment of the present invention. The power monitoring and optimising apparatus 110 comprises a voltage measurement device in the form of an analogue-to-digital voltage converter 120 for receiving a voltage signal from the one or more solar panels 112 to which the apparatus 110 is coupled. The apparatus 110 comprises a current measurement device in the form of an analogue-to-digital current converter 122 for receiving a current signal from the one or more solar panels 112 to which the apparatus 110 is coupled.

The apparatus 110 comprises a processor 124 configured to execute computer readable program code stored, for example, in any known type of memory. The processor 124 is configured to generate a periodic voltage wave or a periodic current wave and apply the periodic wave to an output of the one or more solar panels 112. The periodic wave of frequency f can be generated by a periodic wave generator module 128.

The processor 124 is configured to receive a digital voltage signal from the voltage converter 120 and to receive a digital current signal from the current converter 122.

The processor 124 is configured to calculate a voltage amplitude of the periodic wave applied to the output of the one or more solar panels 112 and to calculate a direct current offset of the periodic wave. In the embodiment shown in FIG. 3A, the processor 124 is configured to apply a Fourier transform to the digital voltage signal and apply a Fourier transform to the digital current signal to calculate the voltage amplitude and the direct current offset of the periodic wave. In the embodiment shown in FIG. 3A, a Fourier transform is applied to the digital voltage signal in module 126. The output of module 126 is the Fourier amplitude of the DC voltage, Vdc, i.e. at zero frequency, and the Fourier amplitude of the voltage Vf at frequency f. A Fourier transform is applied to the digital current signal in module 130. The output of module 130 is the Fourier amplitude of the DC current, Idc, i.e. at zero frequency, and the Fourier amplitude of the current Vf at frequency f.

Figure 3B:
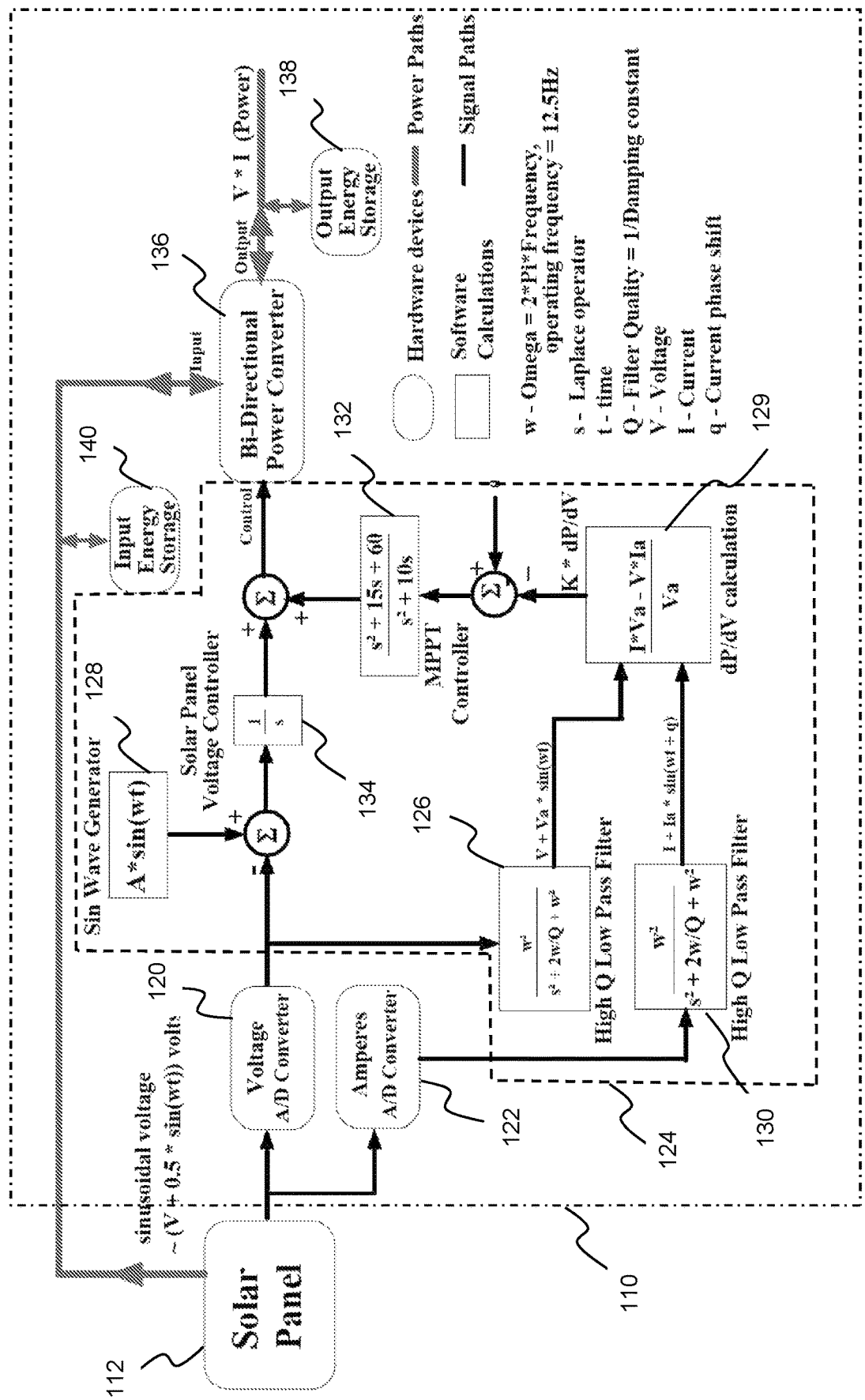
FIG. 3B is a schematic diagram showing power and signal paths within the apparatus shown in FIG. 1 and between a solar panel according to another embodiment of the present invention.

In other embodiments, the processor 124 is configured to apply a low pass filter to the digital voltage signal and to apply a low pass filter to the digital current signal to calculate the voltage amplitude and the direct current offset of the periodic wave, as described with reference to FIG. 3B.

In other embodiments, the processor 124 is configured to apply a low pass filter and a bandpass filter to each of the digital voltage signal and the digital current signal to calculate the voltage amplitude and the direct current offset of the periodic wave.

With further reference to FIG. 3A, the processor 124 is configured to calculate a differential dP/dV of the power and the voltage of the one or more solar panels 112 based on the calculated voltage amplitude and the direct current offset of the periodic wave. In the embodiment shown in FIG. 3A, calculation of the differential dP/dV occurs in module 129.

The processor 124 is configured to modify the voltage of the one or more solar panels 112 such that the differential of the power and the voltage of the one or more solar panels 112 is zero, or substantially zero, i.e. maximised. In some embodiments, the processor 124 maximises the differential of the power and the voltage of the one or more solar panels 112 via a maximum power point (MPPT) controller module 132 and a periodic wave controller module 134.

In some embodiments, the power monitoring and optimising apparatus 110 comprises a bi-directional power converter 136 to receive a control signal from the processor 124 to modify the voltage of the one or more solar panels 112 such that the differential of the power and the voltage of the one or more solar panels is zero, or substantially zero, i.e. maximised. In alternative embodiments, it is envisaged that for most system operating points, a unidirectional converter could be used rather than the bi-directional power converter 136. However, in such embodiments, the periodic wave controller module 134 would lose control on the backward power section of the sine wave at some operating points and therefore is less preferred than the bi-directional power converter 136.

In some embodiments, the periodic wave is applied by moving energy between an output energy storage device 138 in communication with the bi-directional power converter 136 and an input energy storage device 140 in communication with the bi-directional power converter 136 and the one or more solar panels 112. In preferred embodiments, the output energy storage device 138 and the input energy storage device 140 are in the form of capacitors. FIG. 3B shows power and signal paths within the power monitoring and optimising apparatus 110 and between a solar panel 112 according to another embodiment of the present invention. The power monitoring and optimising apparatus 110 comprises an analogue-to-digital voltage converter 120 for receiving a voltage signal from the one or more solar panels 112 to which the apparatus 110 is coupled. The apparatus 110 comprises an analogue-to-digital current converter 122 for receiving a current signal from the one or more solar panels 112 to which the apparatus 110 is coupled. The apparatus 110 comprises a processor 124 coupled to receive a digital voltage signal from the voltage converter 120. The processor 124 is coupled to receive a digital current signal from the current converter 122.

The processor 124 is configured to execute computer readable program code stored, for example, in any known type of memory. In this embodiment, the processor 124 is configured to apply a periodic wave, such as a sinusoidal wave and a low pass filter module 126 to the digital voltage signal from the voltage converter 120. The periodic wave can be generated by a periodic wave generator module 128, such as a sinusoidal wave generator module 128 generating a sinusoidal wave of the form $A*\sin(\omega t)$, where A is the amplitude and $\omega=2\pi v$, where v is the operating frequency. The low pass filter module 126 can be a high Q low pass filter module which filters the voltage signal according to the function $\omega^2/(s^2+(\omega/Q)s+\omega^2)$, where Q is the filter quality=$1/(2*\text{damping constant})$ and s is the Laplace operator, resulting in a filtered voltage signal of the form $V+V_a*\sin(\omega t)$.

The processor 124 is configured to apply a periodic wave, such as sinusoidal wave and a low pass filter module 130 to the digital current signal from the current converter 122. The low pass filter module 130 can be a high Q low pass filter module which filters the current signal according to the function $\omega^2/(s^2+(\omega/Q)s+\omega^2)$, resulting in a filtered current signal of the form $I+I_a*\sin(\omega t+q)$, where q is the current phase shift.

The processor 124 is configured to calculate at 129 a differential dP/dV of the power and the voltage of the one or more solar panels 112 based on the filtered voltage signal from the low pass filter module 126 and the filtered current signal from the low pass filter module 130.

The processor 124 is configured to modify the voltage of the one or more solar panels 112 such that the differential of the power and the voltage of the one or more solar panels 112 is zero, or substantially zero, i.e. maximised.

In some embodiments, the processor 124 maximises the differential of the power and the voltage of the one or more solar panels 112 via a maximum power point (MPPT) controller module 132 and a solar panel periodic wave voltage controller module 134, such as a solar panel sin wave voltage controller module 134. The maximum power point controller module 132 applies the function $(s^2+15s+60)/(s^2+10s)$ and the solar panel sin wave voltage controller module 134 applies the function $1/s$, where $s$ is the Laplace operator.

In some embodiments, the power monitoring and optimising apparatus 110 comprises a bi-directional power converter 136 to receive a control signal from the processor 124 to modify the voltage of the one or more solar panels 112 such that the differential of the power and the voltage of the one or more solar panels is zero, or substantially zero, i.e. maximised. In alternative embodiments, it is envisaged that for most system operating points, a unidirectional converter could be used rather than the bi-directional power converter 136. However, in such embodiments, the solar panel sin wave voltage controller 134 would lose control on the backward power section of the sine wave at some operating points and therefore is less preferred than the bi-directional power converter 136.

In some embodiments, the sinusoidal wave is applied by moving energy between an output energy storage device 138 in communication with the bi-directional power converter 136 and an input energy storage device 140 in communication with the bi-directional power converter 136 and the one or more solar panels 112. In preferred embodiments, the output energy storage device 138 and the input energy storage device 140 are in the form of capacitors.

In some embodiments, a 12.5 Hz sinusoidal voltage from the sine wave generator module 128 of 250 millivolts to 500 millivolts peak to peak is applied to the solar panels 112 using the solar panel sin wave voltage controller module 134 via the bi-directional power converter 136 and the input and output energy storage devices 140, 138 in the form of capacitors. The sinusoidal voltage produces a near sinusoidal current. The current is not quite sinusoidal due to the non-linear VI curve of the solar panels 112. The near sinusoidal current multiplied by the sinusoidal voltage changes from in phase with the voltage wave when the voltage of the solar panel 112 is larger than the maximum power point to 180 degrees out of phase when the voltage across the solar panel 112 is less than the maximum power point of the solar panel 112, and zero when the voltage across the solar panel 112 is at the maximum power point. Hence, the instantaneous power calculation changes in phase and this phase change can be used to detect the maximum power point.

Both the voltage signals and current signals are put through the low pass filter modules 126, 130 with a resonant peak at 12.5 Hz, i.e. the voltage signals and current signals have imaginary poles in the filter transfer functions. This processing generates two parts to the signal, a constant part and a sinusoidal part. It can be shown that the change of power divided by the change in panel voltage is equal to a linear combination of the maximum and minimum values of the sinusoidal voltage and the maximum and minimum values of the sinusoidal current. This gives a direct and very fast measurement of the power point of the solar panels 112, which can be used in a feedback controller comprising the MPPT controller module 132 and the solar panel sin wave voltage controller module 134 to move the voltage to the maximum power point very quickly.

Embodiments of the present invention are able to reject unwanted voltage and current signals, for example, by using narrow bandwidth resonant filters at the measurement frequency, which addresses some of the problems of prior art solar panel management systems and apparatus, which have severe difficulty with noise rejection.

The output of the bi-directional power converter 136 is not constrained ether by voltage or current. This makes the series electrical connection of solar panels 112 behave as if the solar panels are connected in parallel. By not constraining either voltage or current, a degree of freedom is added to the output of the bi-directional power converter 136. In contrast, known power management systems, methods and apparatus constrain either output voltage or output current, therefore making a fully constrained system where the system behaves only as a series system, with generally poor power management. By not constraining either the voltage or current at the output of the bi-directional power converter 136 the system voltage and current is determined by the connected load.

The voltage and current of the bi-directional power converter 136 must however be constrained within the operating limits of the system. This is achieved by putting a voltage and current controller on the bi-directional power converter output which switch off the MPPT control loop and control the voltage or current to the maximum system value. At these operating points the solar panel 112 is unable to deliver all of the power available and will not operate at the maximum power point. The periodic wave controller module 134 may be considered as a fast inner control loop and the MPPT controller 132 may be considered as a slower outer control loop. When power is removed from the output of the bi-directional power converter 136 the control loops stabilize very quickly to a new operating point of the voltage and current of the solar panel(s) 112. The maximum power point calculation is discrete at the frequency of the periodic wave generator 128, which in some embodiments is 12.5 times per second. This allows the power point to be tracked extremely quickly, in time frames of around 200 milliseconds.

Figure 4:
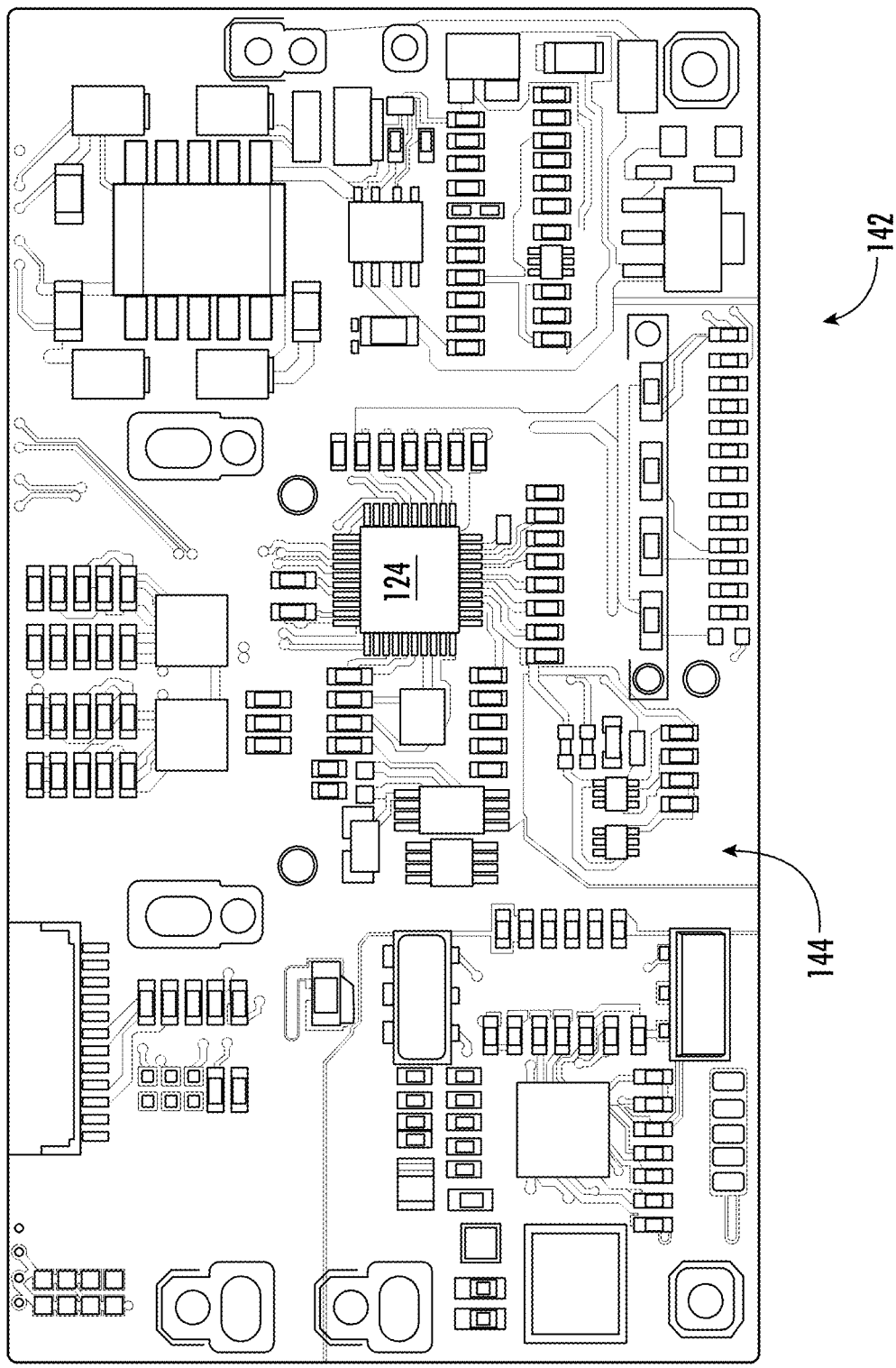
FIG. 4 is an image showing a control side of a printed circuit board of the power monitoring and optimising apparatus according to an embodiment of the present invention.
Figure 5:
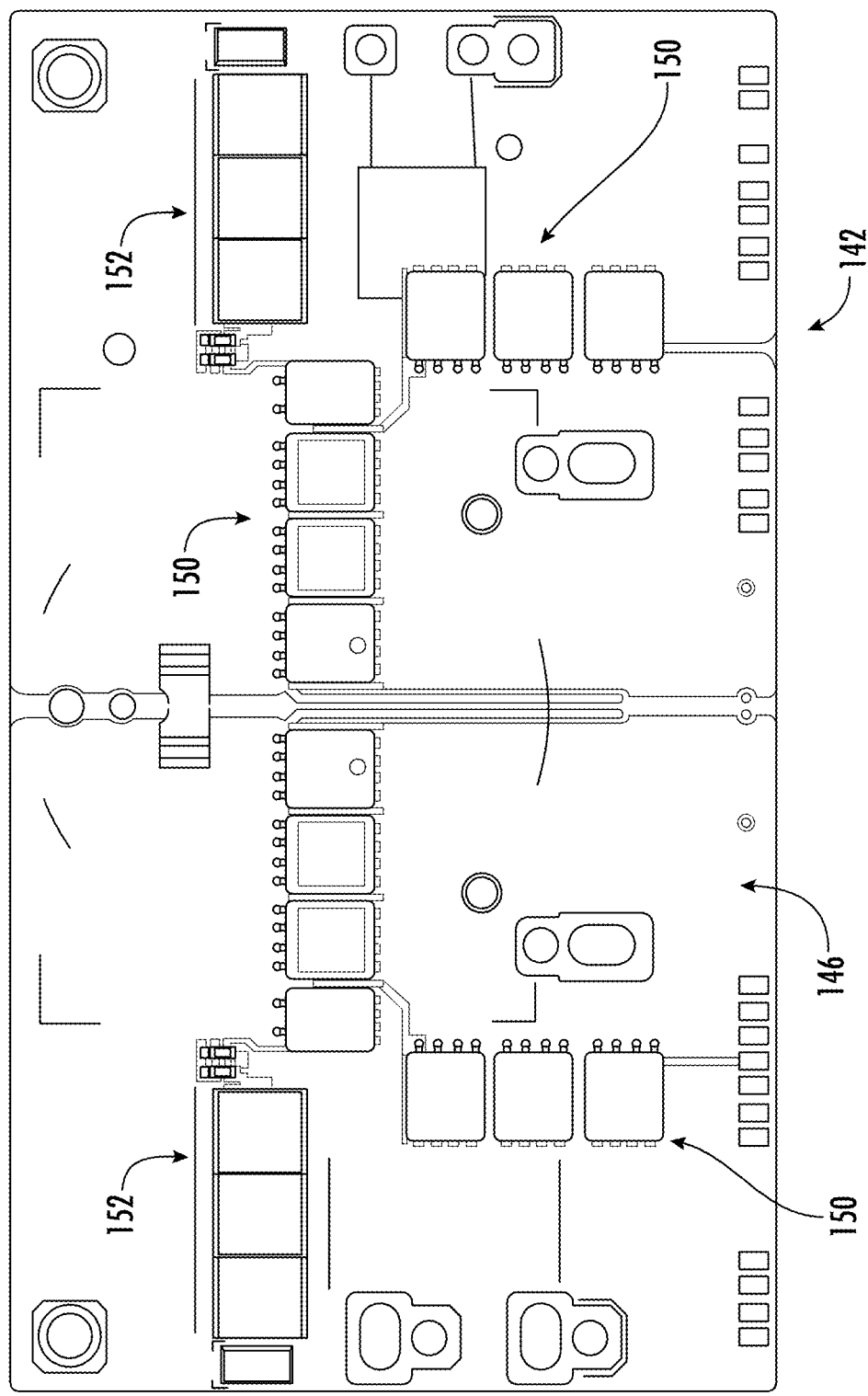
FIG. 5 is an image showing a power side of the printed circuit board shown in FIG. 4 without a power inductor attached.
Figure 6:
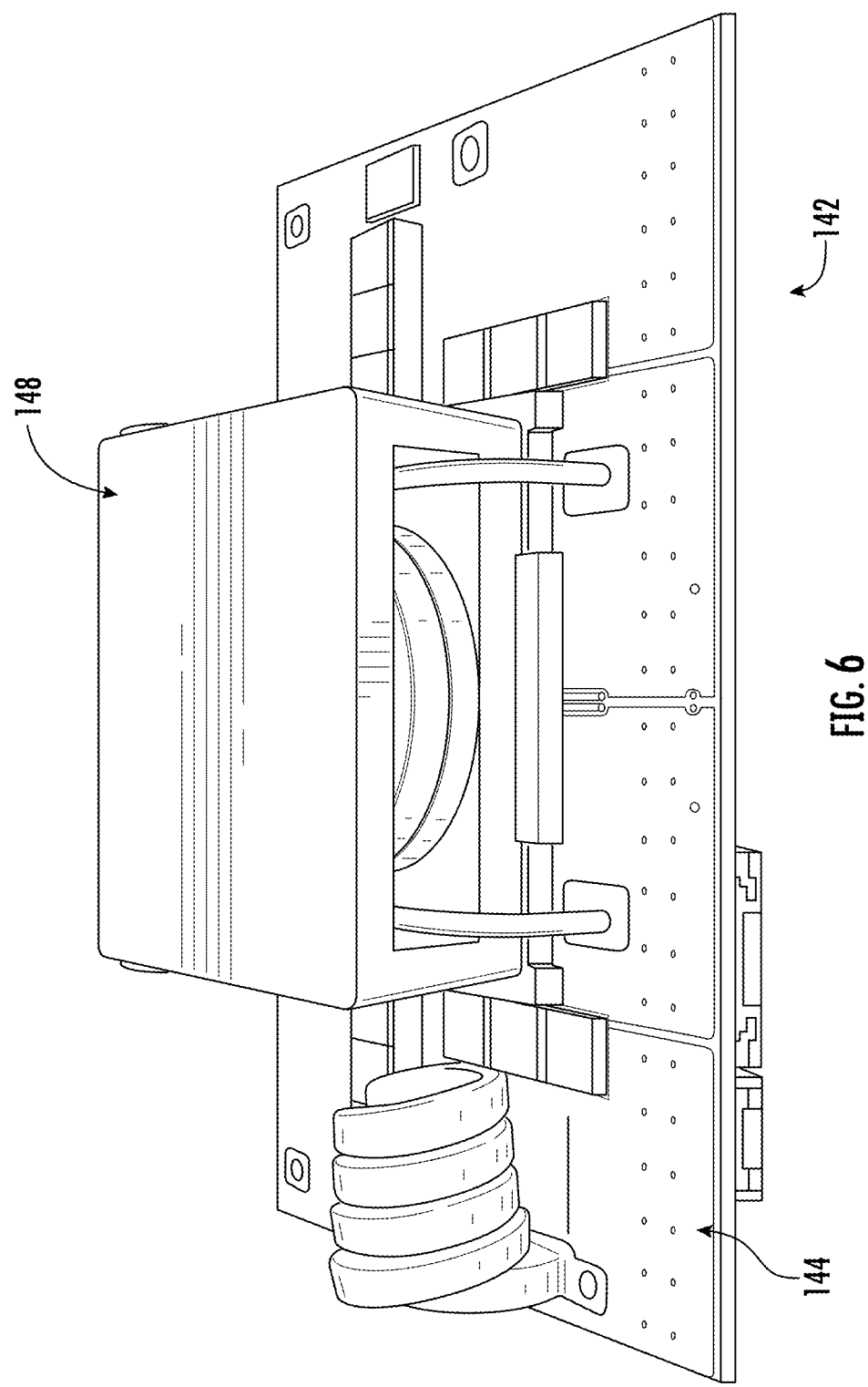
FIG. 6 is an image showing the power side of the printed circuit board shown in FIG. 5 showing the power inductor attached.

FIGS. 4, 5 and 6 show images of a printed circuit board (PCB) 142 of the power monitoring and optimising apparatus 110 according to some embodiments. FIG. 4 shows a control side 144 of the PCB 142 including the processor 124. FIG. 5 shows a power side 146 of the PCB 142, which is the other side of the control side 144 shown in FIG. 4. FIG. 6 shows the power side 146 of the PCB 142 shown in FIG. 5 with a power inductor 148 attached.

On the power side 146, the power switching components 150 are arranged in a tight C configuration around the terminals of the power inductor 148. This is the optimal arrangement to achieve the shortest connections between the power switching components 150 and the power inductor 148. The capacitors 152 are mounted very close to the power switching components 150 giving a near optimal design. This arrangement, together with the small surface-mounted power components 150 enable very fast switching times of the order of 25 nanoseconds in some embodiments without producing unwanted harmonic interference. This very small power switching design in this embodiment provides very high switching speeds and very low power loss. The embodiment of the PCB 142 shown in FIGS. 4-6 is rated at 1000 W transfer capacity with no heat sinks, other than the PCB 142 itself. The embodiment of the PCB 142 shown in FIGS. 4-6 is only 90 mm×50 mm with a mass of about 400 g, which is very small and light for a 1000 W converter. Because of the very low heat production of the power components 150, it is possible to use a full plastic enclosure with high thermal conductive silicon rubber as a heat connection between the PCB 142 and the enclosure. The full plastic enclosure allows safety compliance to be achieved for higher voltages and enables the power monitoring and optimising apparatus 110 to be used in very harsh environmental conditions including, but not limited to solar farms built over seas and oceans, where metal enclosures would corrode.

This relative arrangement of the power and control components on the PCB 142 is somewhat counter intuitive in the field of power engineering because electrical noise generated by the power switching circuits is very closely coupled to the measurement and control electronics. However, in the embodiments of the present invention, the power switching arrangement is so electrically quiet that even a radio modem receiver can work placed 1 mm from the power switching components. The small size of the power monitoring and optimising apparatus 110, the fast switching times and the vastly reduced switching noise contribute to the real power efficiencies achieved in systems comprising the power monitoring and optimising apparatus 110, examples of which are shown in FIG. 7.

Figure 7:
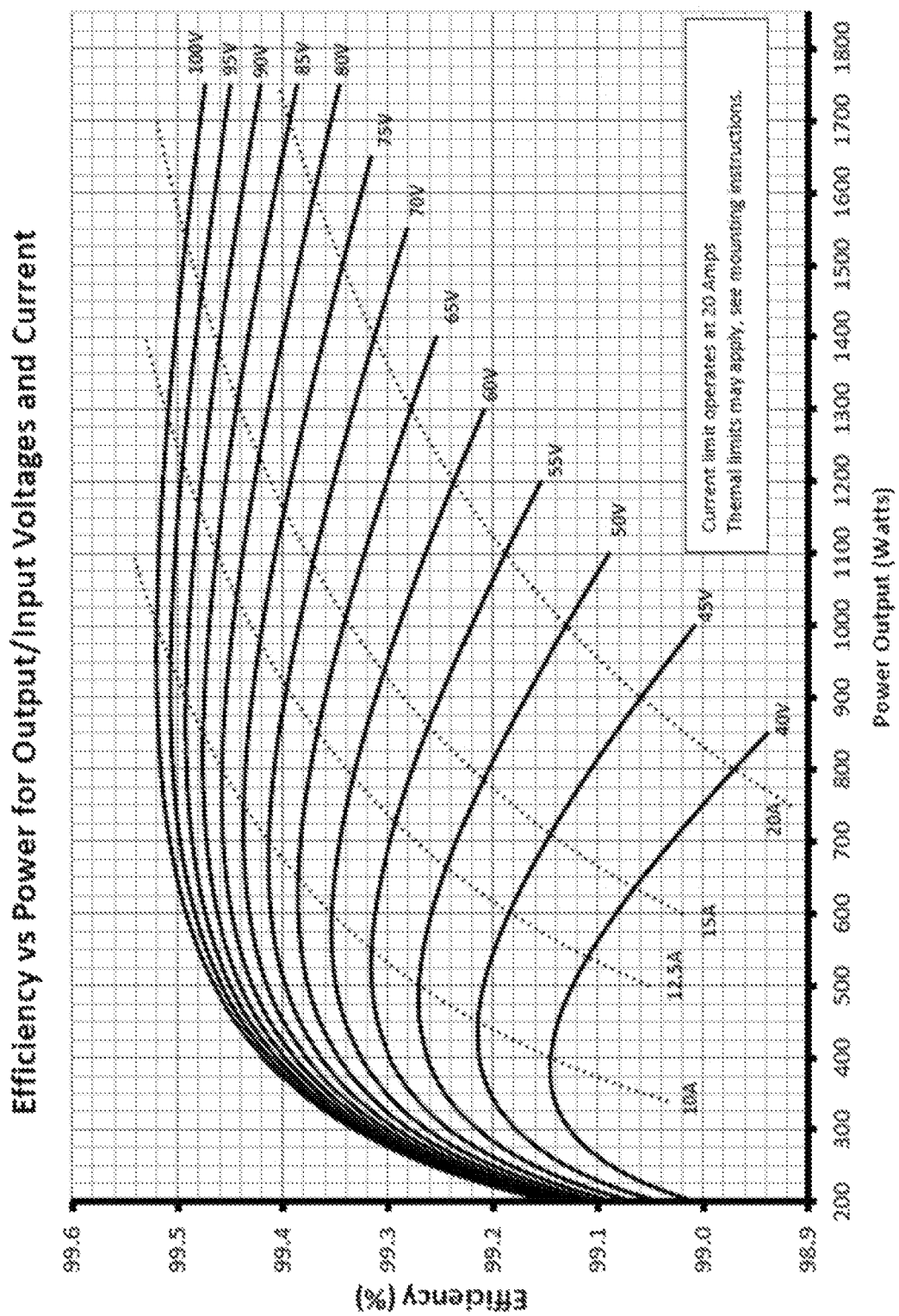
FIG. 7 is a graph showing the variation of efficiency versus power output for solar panels at various input voltages and currents.

FIG. 7 shows the efficiencies achieved using the power monitoring and optimising apparatus 110 and systems 100, 200 according to embodiments of the present invention for different input and output voltages and currents. Voltage curves for 40V, 45V, 50V, 55V, 60V, 65V, 70V, 75V, 80V, 85V, 90V, 95V and 100V and current curves for 10 A, 12.5 A, 15 A and 20 A are shown in FIG. 7. The current limit is the maximum current at the input $I_{in}$, if the voltage in ($V_{in}$) is less than the voltage out ($V_{out}$), ($V_{in}<V_{out}$), and the maximum current at the output $I_{out}$ if $V_{in}$ is greater than $V_{out}$, ($V_{in}>V_{out}$). To find the operating point, take the lower of the input and output voltages and find where that voltage crosses the desired operating power point.

The power monitoring and optimising apparatus 110 is the first device to be able to measure if the power output of the solar panel 112 is tracking at the maximum power point. This is achieved by ramping up the voltage of the solar panel 112 by about 1V in about 2.5 seconds, then ramping the voltage down by about 2V in about 5 seconds, then ramping the voltage up to the voltage before the test started. If the power output of the solar panel 112 is tracking on the maximum power point, a "W" is displayed on a plot of power verses time. This is achievable because of the very fast power point tracking of the MPPT controller module 132.

With reference to FIG. 8, another important aspect of the present invention is the ability of the power monitoring and optimising apparatus 110 to detect the state of a solar circuit breaker 154 or isolator switch by applying a small voltage pulse on the solar string looking for a current. A capacitor 156 is placed on the load side of the solar circuit breaker 154 and when the solar circuit breaker 154 (switch) is closed the power monitoring and optimising apparatus 110 can "see" the capacitor 156. Because the measurement requires a capacitor, the measurement is not affected by DC offset or resistance, and so does not detect, for example, water from a firefighter's hose in the event of a fire. This is now described in some further detail with reference to FIGS. 9A and 9B.

The default state of the output of the power monitoring and optimising apparatus 110 is "Off", which is the safe state of zero volts. The working voltage on the output of the apparatus 110 is managed by a state machine which checks the system state to ensure it is safe to transition from the "Off" state to the "On" state. In the "Off" state each power monitoring and optimising apparatus 110 transitions its output from 0V to about 0.7V, waits about 2 milliseconds, and then transitions the output back to zero volts, as shown in FIG. 9A. During the voltage transition the current is measured. From the time of the first upward voltage transition and the down voltage transition, the current in integrated. During the following two milliseconds, the negative of the current is integrated, as shown in FIG. 9B. The current integration will be a large positive number only if there is a large capacitor 156 connected across the output terminals of the solar string. The current integration causes any offsets, such as a resistance (water etc.) between the output terminals to have zero effect of the integration. When a capacitor is placed in the load side of the solar circuit breaker 154, the power monitoring and optimising apparatus 110 will put its output voltage to the working "On" voltage unless it can detect the capacitor 156, that is, if the solar circuit breaker 154 is closed. Each apparatus 110 puts a pulse at a walking random time about 500 msec apart which on average has one apparatus 110 execute the pulse at any one time. However, any overlapping pulses do not have any effect on the measurement. The integrated current is put through a low pass filter module e.g. 130, and if the integrated current reaches a set threshold, the apparatus 110 deems the solar circuit breaker 154 to be closed. Once the connection has been established, the connection is maintained so long as there is more than a small threshold of current flowing, e.g. 50 milliamps. If the current drops below the threshold, the power monitoring and optimising apparatus 110 deems the solar circuit breaker 154 to be open and reduces the output voltage to zero and starts the connection sequence again.

The apparatus 110 is responsible for connecting its power to the circuit and the apparatus 110 detect that the solar circuit breaker 154 has been closed continuously for e.g. five seconds before raising the output voltage to the working voltage. This detection mechanism requires that the conductors which connect the string are all connected properly and are not broken. The apparatus 110 will disconnect its power within e.g. 5 seconds of the string conductors becoming disconnected, or the solar isolator being switched to the off position. The apparatus 110 will also disconnect within e.g. 5 seconds of the inverter input current going to zero, i.e. the mains has been disconnected and the inverter shutdown according to Australian and New Zealand standards AS/NZS 4777. The connection logic is based on a differential measurement which rejects constant biases on the string conductors, such as water from firefighters' hoses and will not connect if water shorts exposed conductors. Each apparatus 110 has the following safety trips which stop the power transfer and put the output to zero volts in five microseconds: output short circuit; reverse power; over current; input voltage high; output voltage high; internal power supply failure. Recovery from these trip conditions is automatic and the apparatus 110 will restart automatically if able to do so.

Figure 10:
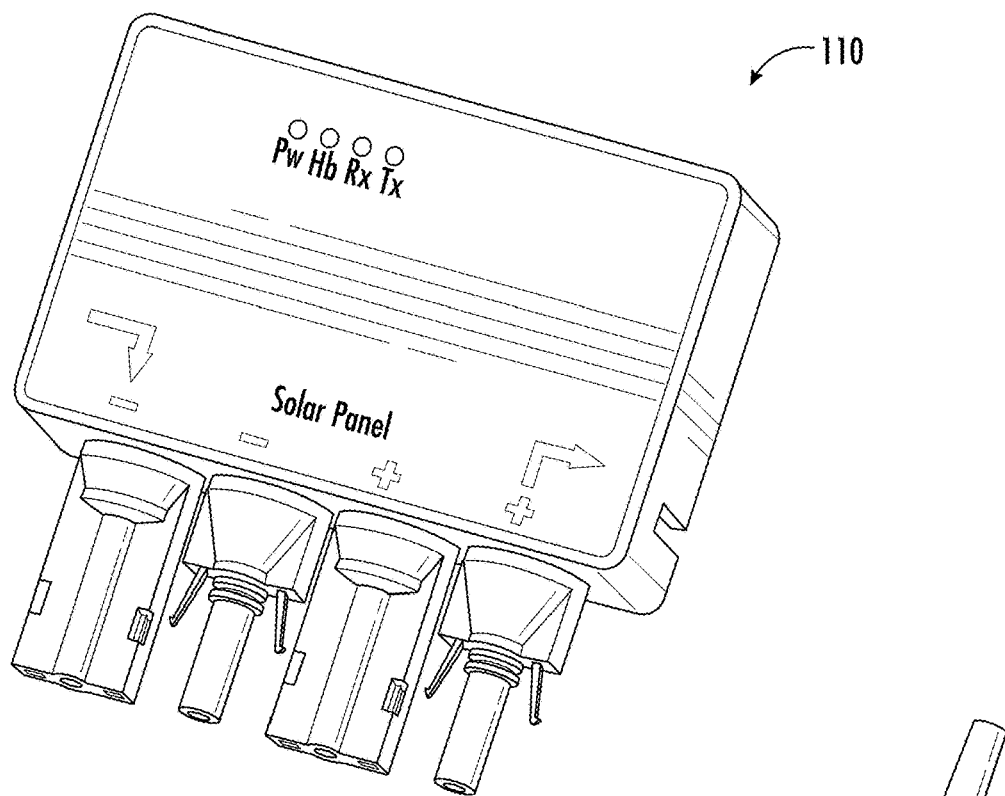
FIG. 10 is a perspective view of the power monitoring and optimising apparatus comprising a safety switch shown in FIG. 1.
Figure 11:
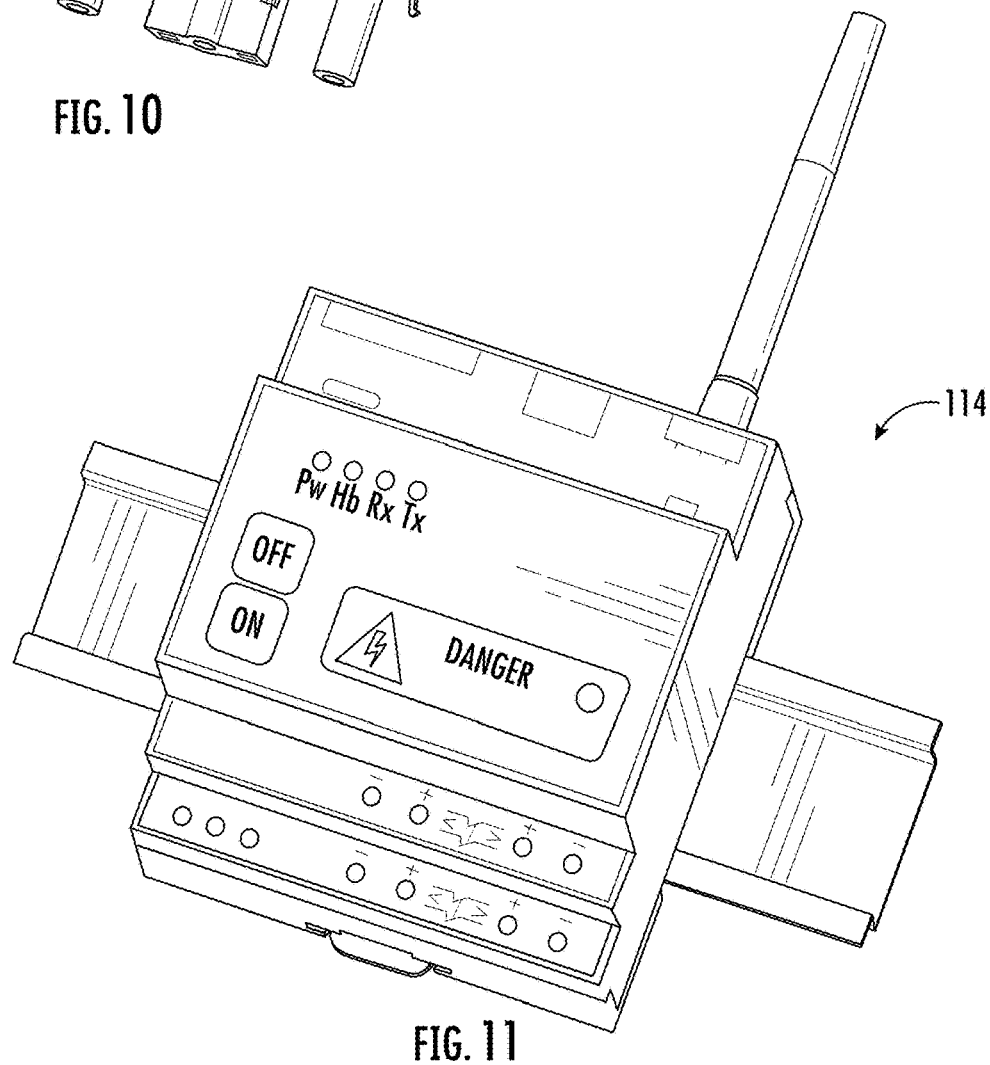
FIG. 11 is a perspective view of a communications device and safety indicator of the system shown in FIG. 1.

FIG. 10 is a perspective view of the power monitoring and optimising apparatus 110 according to an embodiment of the present invention. FIG. 11 is a perspective view of the communications device and safety indicator 114 of the system 100, 200 shown in FIGS. 1 and 2 respectively. The apparatus 110 and the communications device and safety indicator 114 are designed to meet the Safety integrity level SIL2 safety standard. SIL2 is a requirement of IEC 61508 electrical certification. This allows adoption within industries such as, but not limited to mining sites, government sites, military sites and solar farms.

According to some embodiments, the communications device and safety indicator 114 comprises CAN hardware to be able to support CAN devices where available. DeviceNet hardware can also be provided on the communications device and safety indicator 114 to connect to one or more intelligent measurement and control devices and to connect to other equipment supporting DeviceNet. The communications device and safety indicator 114 can also comprise a 1 Mbit/Sec RS485 port for connection to any device supporting RS485, including third party invertors.

Figure 12:
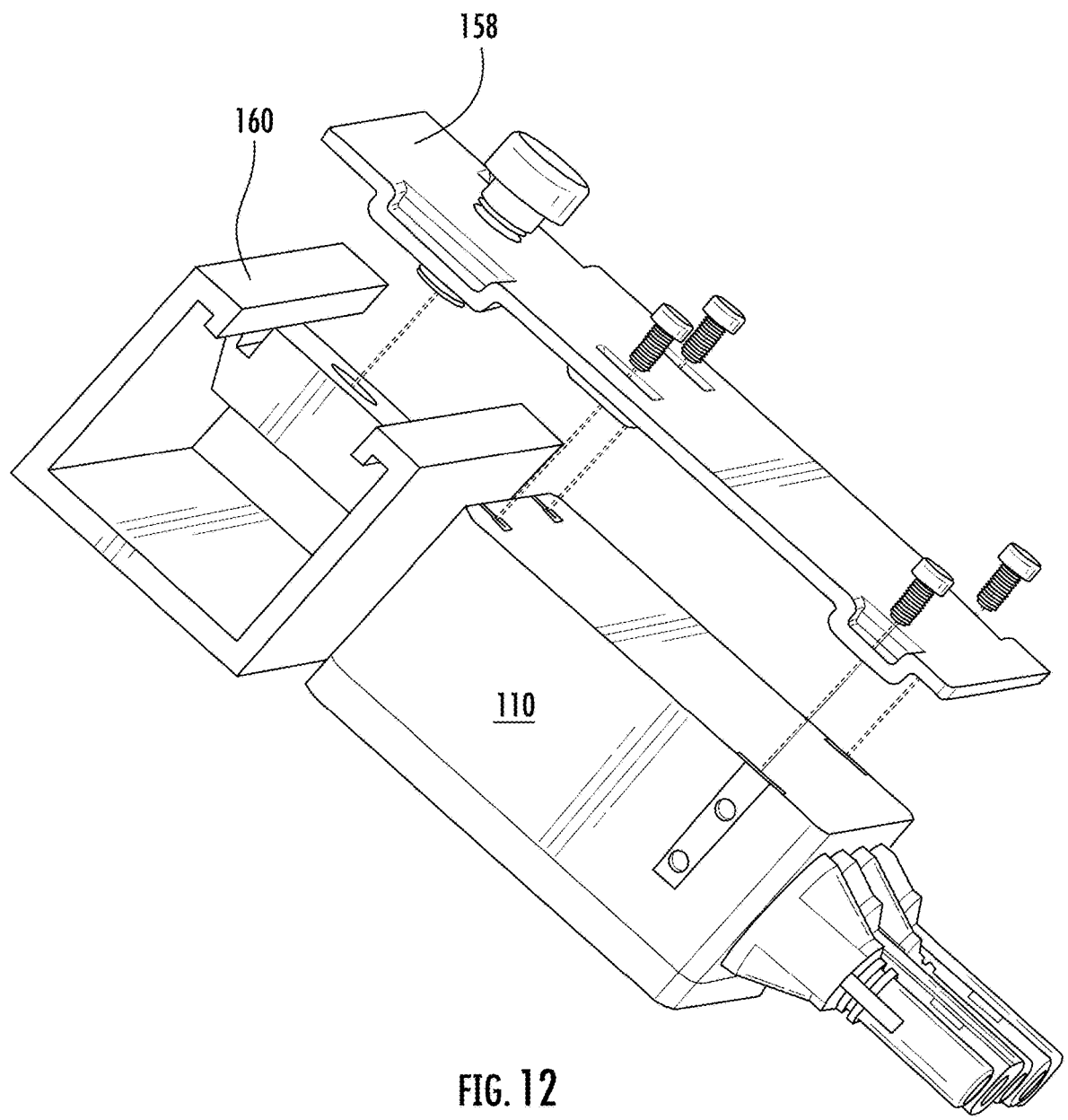
FIG. 12 is a rear perspective view of the power monitoring and optimising apparatus shown in FIG. 1 and a mounting bracket for coupling the apparatus to a solar panel mounting frame.

FIG. 12 is a rear perspective view of the power monitoring and optimising apparatus 110 and a mounting bracket 158 for coupling the apparatus 110 to a solar panel mounting frame 160. A plurality of first fasteners pass through first apertures in the mounting bracket 158 and into aligned apertures in the rear of the plastic enclosure of the power monitoring and optimising apparatus 110. A second fastener passes through a second aperture in the mounting bracket 158 and into an aligned aperture in the solar panel mounting frame 160.

Figure 13:
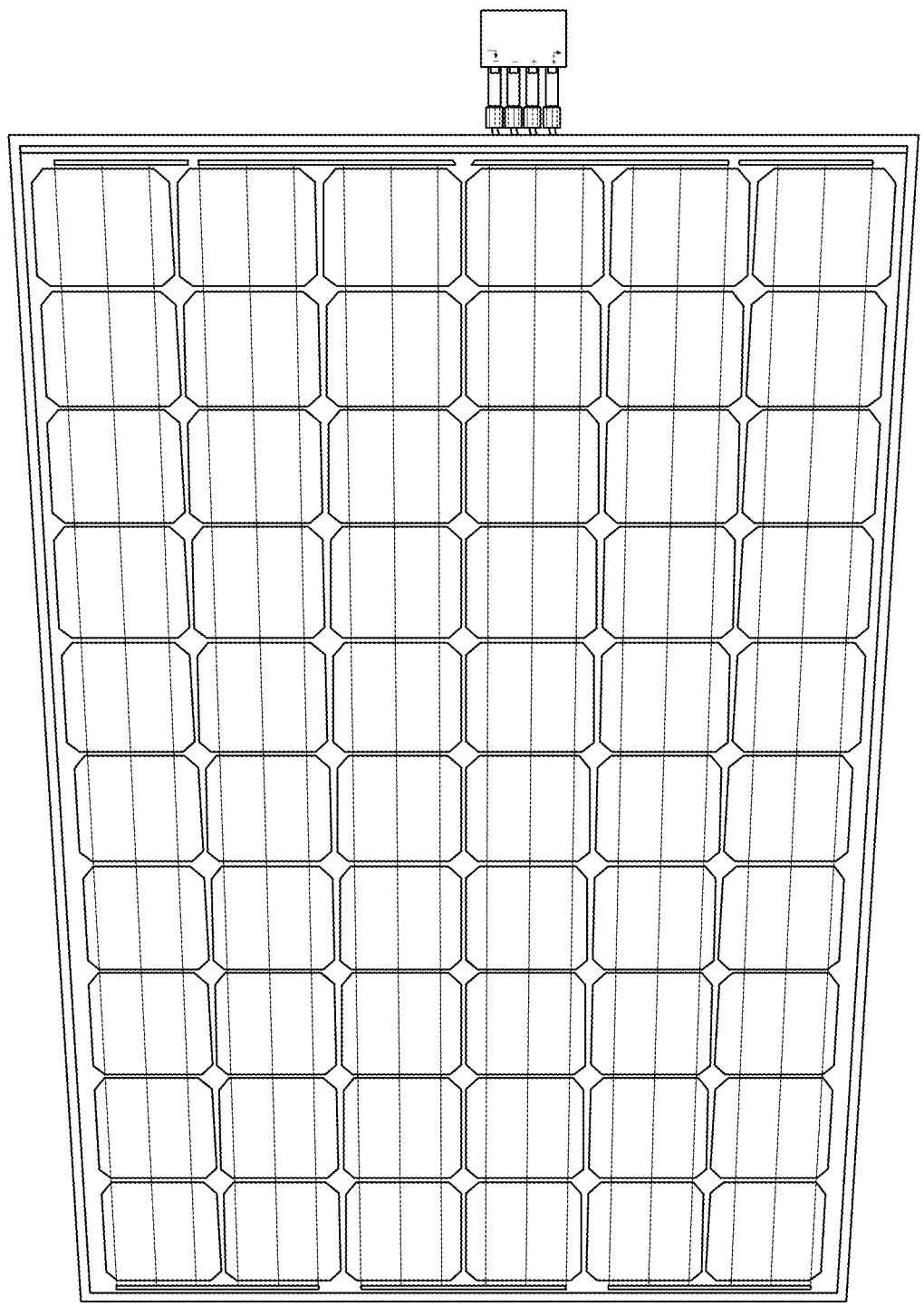
FIG. 13 is an image showing the power monitoring and optimising apparatus shown in FIG. 1 coupled to a solar panel indicating the small relative size of the apparatus.

FIG. 13 is an image showing the power monitoring and optimising apparatus 110 coupled to a standard 280 W solar panel 112 thus indicating the small relative size of the apparatus 110.

Figure 14:
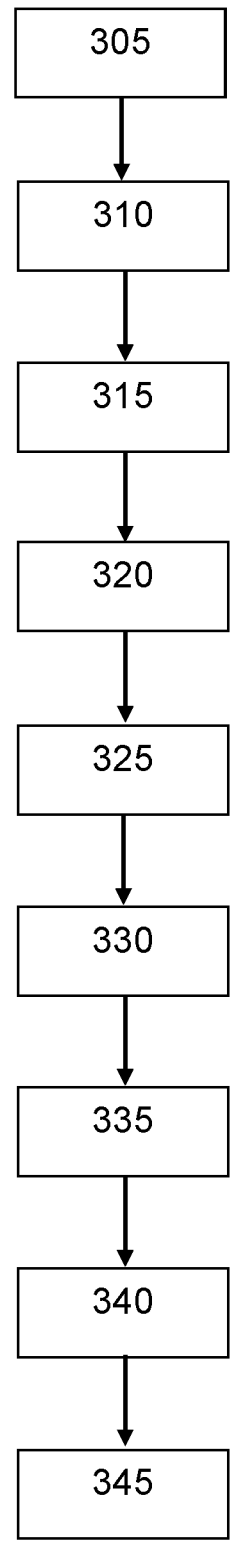
FIG. 14 is a general flow diagram illustrating a method of the power monitoring and optimising apparatus monitoring and optimising the power output by one or more solar panels.

It will be appreciated that another aspect of the present invention is directed to a method 300 of monitoring and optimising power output by one or more solar panels 112 by coupling the apparatus 110 to the one or more solar panels 112. With reference to FIG. 14, the method 300 comprises at 305 receiving, in the analogue-to-digital voltage converter 120 of the apparatus 110, a voltage signal from the one or more solar panels 112. At 310, the method 300 comprises receiving, in the analogue-to-digital current converter 122 of the apparatus 110, a current signal from the one or more solar panels 112. At 315, the method 300 comprises receiving, in the processor 124 coupled to the voltage converter 120 the digital voltage signal. At 320, the method 300 comprises receiving, in the processor 124 coupled to the current converter 122, the digital current signal. At 325, the method 300 comprises the processor 124 applying a sinusoidal wave and a low pass filter to the digital voltage signal. The method 300 comprises at 330 the processor 124 applying a sinusoidal wave and a low pass filter to the digital current signal. At 335, the method 300 comprises the processor 124 calculating a differential of a power and a voltage of the one or more solar panels based on the output from the low pass filters. At 340, the method 300 comprises the processor 124 modifying the voltage of the one or more solar panels 112 such that the differential of the power and the voltage of the one or more solar panels is zero, or substantially zero, i.e. maximised. In preferred embodiments, at 345, the method 300 preferably comprises the bi-directional power converter 136 receiving a control signal from the processor 124 to modify the voltage of the one or more solar panels 112 such that the differential of the power and the voltage of the one or more solar panels is zero, or substantially zero.

It is envisaged that in alternative embodiments of the present invention, the sin wave generator module 128 can be replaced with a square wave generator module, a sawtooth generator module or other periodic wave generator module to generate any repeating wave of arbitrary shape and constant frequency. Preferably, the periodic wave is a sinusoidal wave, but the periodic wave can be a square wave, sawtooth wave or periodic wave of another shape. It is understood that any wave shape repeated at a constant frequency will have primary Fourier components in the form of a sinusoidal wave at a constant frequency. The constant frequency element provides the fundamental sinusoidal components which when filtered by the low pass filters produce sinusoidal outputs and hence the MPPT dP/dV calculation. In such embodiments the Fourier components of the signal would primarily be a sinusoidal wave. In such embodiments, the solar panel sin wave voltage controller module 134 would be replaced with a solar panel square wave voltage controller module or other wave shape voltage controller. The signal processing as described herein, in particular with reference to FIGS. 3A and 3B, could be modified as required such that the systems, methods and apparatus for monitoring and optimising power output by one or more solar panels would work with a square wave generator module, sawtooth wave generator module or other wave shape generator module in apparatus 110 rather than the sin wave generator module 128.

In some embodiments, the bi-directional power converter 136 or unidirectional converter connects to a battery, or any voltage which is not zero at the output, for example, the adjacent energised solar strings comprising the solar panels 112. The converter 136 calculates the internal switching times for the pulse width modulator so that if the PWM is switched at calculated switching times the voltages in the input and output would match the voltages present. This allows the converter 136 to be started without causing a large current to flow in either the input or output, thus allowing the converter 136 to start when connected to, for example, the battery 118, or connected to energised adjacent strings of solar panels 112.

In some embodiments, the apparatus 110 comprises a thermal fuse in the input to add to the safety aspect of the present invention. The thermal fuse open circuits when the temperature of the power switching components 150 become greater than the manufacturers specification for the power switching components 150, which is typically around 150 degrees Celsius. In the case of a fire, or external heat source, the input to the power converter is then permanently removed from the power source, thus ensuring that the power is disconnected to elevated temperatures.

Hence, embodiments of the present invention address or at least ameliorate the aforementioned problems of the prior art by providing a power monitoring and optimising apparatus 110 which can provide very fast power switching and monitoring of the output power of one or more solar panels to which it is connected to maximise the power output of the one or more solar panels. The arrangement of components on the PCB 142 maximises power switching speeds, minimises harmonic noise and avoids the need for a heat sink, which enables the apparatus to be small and lightweight. Typically, the apparatus 110 can adapt to changes in sunlight and adjust the power within about 2 seconds. The very low heat production of the power components enables the apparatus 110 to have a full plastic enclosure which allows safety compliance to be achieved for higher voltages and enables the apparatus 110 to be used in very harsh environmental conditions. The ability of the power monitoring and optimising apparatus 110 to detect the state of a solar circuit breaker 154 or isolator switch also enables the state of the solar array to be determined before firefighters' hoses are used in the event of a fire. According to some embodiments, use of the apparatus 110 and the communications device and safety indicator 114 results in power increases of 16-25% compared with the same solar array without the apparatus 110 and device 114. When installed, each solar panel 112 is transferring more power to the invertor, with less lost to heat on the panel itself.

After an emergency lockout has been set, the apparatus 110 will not provide lethal voltages under any circumstances. This state is preserved after a power outage, after disconnection from the solar array, or when the apparatus 110 powers down, e.g. overnight. Only when the apparatus 110 have the emergency lockout switched off manually will voltages be produced that have the potential to be lethal.

This can be set by turning off the mains power and/or pressing the off button onboard the attached communications device and safety indicator 114.

Each apparatus 110 monitors the state of the solar circuit and a break in the circuit triggers the apparatus 110 to reduce the output to zero volts. Safety is ensured even if the central control circuits and communications to the apparatus 110 are not functioning. When the mains power source is disconnected the apparatus 110 disconnect and keep the voltage in the solar circuit at zero. This allows one disconnection point in the case of emergency.

No extra data connection wires are needed. Wherever solar panels can be installed, the apparatus 110 and the communications device and safety indicator 114 can be installed. All current solar inverters are supported and the apparatus 110 and the communications device and safety indicator 114 can be retrofitted on all existing systems. It is also possible to replace current panels with off-brand or different voltage panels and the present invention will adapt thereto. The present invention will also work with all current solar batteries and can be directly connected to lead acid batteries.

According to preferred embodiments, data collection is continual and is accessible via a downloaded application (app). Panel by panel data is collected in real time and backed up locally to prevent data loss in the event of a power or internet outage.

The apparatus 110 is fitted with high current, very low forward voltage Schottky bypass diodes fitted to both the input and output terminals. The bypass diodes protect against incorrect connections and provide a current path in the event of failure of a solar panel 112 or the apparatus 110. Secondary 12V power supply is available for remote installations where power may be inconsistent.

In this specification, the terms, "first", "second" etc. are intended to differentiate between different features of the present invention and are not intended to limit the present invention to a particular order of implementation unless the context indicates otherwise.

In this specification, the terms "comprises", "comprising" or similar terms are intended to mean a non-exclusive inclusion, such that an apparatus that comprises a list of elements does not include those elements solely but may well include other elements not listed.

The reference to any prior art in this specification is not, and should not be taken as, an acknowledgement or any form of suggestion that the prior art forms part of the common general knowledge.

It will be appreciated that the present invention is not limited to the specific embodiments described herein. Skilled addressees will identify variations from the specific embodiments described herein that will nonetheless fall within the scope of the present invention, which is determined by the following claims.

The invention claimed is:

1. An apparatus for coupling to one or more solar panels to monitor and optimize power output by the one or more solar panels, the apparatus comprising:
    a processor configured to generate a periodic wave and apply the periodic wave to an output of the one or more solar panels;
    an analogue-to-digital voltage converter for receiving a voltage signal from the one or more solar panels; and
    an analogue-to-digital current converter for receiving a current signal from the one or more solar panels;
    wherein the processor is configured to:
        receive a digital voltage signal from the voltage converter and a digital current signal from the current converter;
        calculate a voltage amplitude of the periodic wave applied to the output of the one or more solar panels and a direct current offset of the periodic wave using signal processing techniques that isolate a fundamental frequency component and a zero frequency component of the periodic wave;
        calculate a differential of a power and a voltage of the one or more solar panels based on the voltage amplitude and the direct current offset of the periodic wave; and
        modify the voltage of the one or more solar panels such that the differential of the power and the voltage of the one or more solar panels is zero, or substantially zero.

2. The apparatus of claim 1, wherein the periodic wave is selected from the following: any repeating wave of arbitrary shape; a sinusoidal wave; a square wave; a sawtooth wave; a periodic wave of another shape.

3. The apparatus of claim 1, wherein the periodic wave is a repetitive voltage wave or a repetitive current wave applied to the output of the one or more solar panels.

4. The apparatus of claim 1, wherein the periodic wave is of constant frequency between measurement cycles or a frequency of the periodic wave differs between measurement cycles.

5. The apparatus of claim 1, wherein the processor is configured to apply a low pass filter to the digital voltage signal and apply a low pass filter to the digital current signal to calculate the voltage amplitude and the direct current offset of the periodic wave.

6. The apparatus of claim 1, wherein the processor is configured to apply a low pass filter and a bandpass filter to each of the digital voltage signal and the digital current signal to calculate the voltage amplitude and the direct current offset of the periodic wave.

7. The apparatus of claim 1, wherein the processor is configured to apply a Fourier transform to the digital voltage signal and apply a Fourier transform to the digital current signal to calculate the voltage amplitude and the direct current offset of the periodic wave.

8. The apparatus of claim 1, comprising a bi-directional or unidirectional power converter to receive a control signal from the processor to modify the voltage of the one or more solar panels such that the differential of the power and the voltage of the one or more solar panels is zero, or substantially zero.

9. The apparatus of claim 8, wherein the control signal is based on the output of a maximum power point controller module and the output of a periodic wave controller module of the apparatus.

10. The apparatus of claim 9, wherein the periodic wave controller module is a voltage controller module or a current controller module.

11. The apparatus of claim 8, wherein the periodic wave is applied by moving energy between an output energy storage device in communication with the bi-directional or unidirectional power converter and an input energy storage device in communication with the bi-directional or unidirectional power converter and the one or more solar panels.

12. The apparatus of claim 11, wherein the output energy storage device and/or the input energy storage device are in the form of capacitors.

13. The apparatus of claim 1, comprising a printed circuit board (PCB) having a first control side comprising the processor and a second, opposite power side comprising a plurality of power switching components.

14. The apparatus of claim 13, wherein the plurality of power switching components is arranged substantially in a U shape or a C shape around a power inductor to maximize power switching speeds, and/or minimize harmonic noise and/or avoid the need for a heat sink.

15. The apparatus of claim 1, wherein the apparatus comprises a fully plastic enclosure.

16. The apparatus of claim 1, wherein the apparatus detects a state of a solar circuit breaker or isolator switch coupled to a circuit comprising the apparatus and the one or more solar panels by the apparatus applying a voltage pulse on the circuit looking for a current.

17. The apparatus of claim 16, wherein the circuit comprises a capacitor on the load side of the solar circuit breaker or isolator switch and the apparatus detects the capacitor when the solar circuit breaker or isolator switch is closed.

18. A method of monitoring and optimising power output by one or more solar panels by coupling an apparatus to one or more solar panels, the method comprising:
generating, in a processor, a periodic wave and applying the periodic wave to an output of the one or more solar panels;
receiving, in an analogue-to-digital voltage converter of the apparatus, a voltage signal from the one or more solar panels;
receiving, in an analogue-to-digital current converter of the apparatus, a current signal from the one or more solar panels;
receiving, in the processor coupled to the voltage converter a digital voltage signal;
receiving, in the processor coupled to the current converter, a digital current signal;
the processor:
calculating a voltage amplitude of the periodic wave applied to the output of the one or more solar panels and a direct current offset of the periodic wave using signal processing techniques that isolate a fundamental frequency component and a zero frequency component of the periodic wave;
calculating a differential of a power and a voltage of the one or more solar panels based on the output from the low pass filters; and
modifying the voltage of the one or more solar panels such that the differential of the power and the voltage of the one or more solar panels is zero, or substantially zero and thus maximized.

19. The method of claim 18, wherein the periodic wave is selected from the following: any repeating wave of arbitrary shape; a sinusoidal wave; a square wave; a sawtooth wave; a periodic wave of another shape.

20. The method of claim 18, wherein the periodic wave is a repetitive voltage wave or a repetitive current wave applied to the output of the one or more solar panels.

21. The method of claim 18, wherein the periodic wave is of constant frequency between measurement cycles, or wherein a frequency of the periodic wave differs between measurement cycles.

22. The method of claim 18, wherein calculating the voltage amplitude and the direct current offset of the periodic wave comprises the processor applying a low pass filter to the digital voltage signal and applying a low pass filter to the digital current signal.

23. The method of claim 18, wherein calculating the voltage amplitude and the direct current offset of the periodic wave comprises the processor applying a low pass filter and a bandpass filter to each of the digital voltage signal and the digital current signal.

24. The method of claim 18, wherein calculating the voltage amplitude and the direct current offset of the periodic wave comprises the processor applying a Fourier transform to the digital voltage signal and applying a Fourier transform to the digital current signal.

25. The method of claim 18, comprising a bi-directional or unidirectional power converter receiving a control signal from the processor to modify the voltage of the one or more solar panels such that the differential of the power and the voltage of the one or more solar panels is zero, or substantially zero and thus maximized.

26. The method of claim 25, comprising applying the periodic wave to the output of the one or more solar panels by moving energy between an output energy storage device in communication with the bi-directional or unidirectional power converter and an input energy storage device in communication with the bi-directional or unidirectional power converter and the one or more solar panels.

27. The method of 18, comprising the apparatus detecting a state of a solar circuit breaker or isolator switch coupled to a circuit comprising the apparatus and the one or more solar panels by the apparatus applying a voltage pulse on the circuit looking for a current.

28. The method of claim 27, wherein the circuit comprises a capacitor on the load side of the solar circuit breaker or isolator switch and the method comprises the apparatus detecting the capacitor when the solar circuit breaker or isolator switch is closed.

29. A solar communication and monitoring system comprising one or more of the power monitoring and optimization apparatus as claimed in claim 1 coupled to one or more solar panels in a circuit, wherein the one or more power monitoring and optimization apparatus are configured to modify the voltage of the one or more solar panels such that the differential of the power and the voltage of the one or more solar panels is zero, or substantially zero, thus maximizing the power output of the one or more solar panels.

30. The system of claim 29, wherein each power monitoring and optimization apparatus is coupled to one solar panel, or each power monitoring and optimization apparatus is coupled to a plurality of solar panels.

31. The system of claim 29, wherein, the solar panels are connected in series and the power monitoring and optimization apparatus are connected in series and the power monitoring and optimising apparatus are coupled to a communications and safety indicator apparatus.

32. The system of claim 29, wherein the apparatus detects a state of a solar circuit breaker or isolator switch coupled to the circuit by the apparatus applying a voltage pulse on the circuit looking for a current.

33. The system of claim 32, wherein the circuit comprises a capacitor on the load side of the solar circuit breaker or isolator switch and the apparatus detects the capacitor when the solar circuit breaker or isolator switch is closed.

34. A solar power monitoring and optimization kit comprising one or more of the power monitoring and optimization apparatus as claimed in claim 1 for coupling to one or more solar panels and a communications and safety indicator apparatus for coupling to the one or more power monitoring and optimization apparatus, to an inverter and/or battery and to the mains.

* * * * *